Feb. 4, 1941.                G. J. BAIR ET AL                2,230,344
     METHOD OF REMOVING MAGNETIC IMPURITIES FROM FINELY DIVIDED MATERIALS
                           Filed Oct. 22, 1938
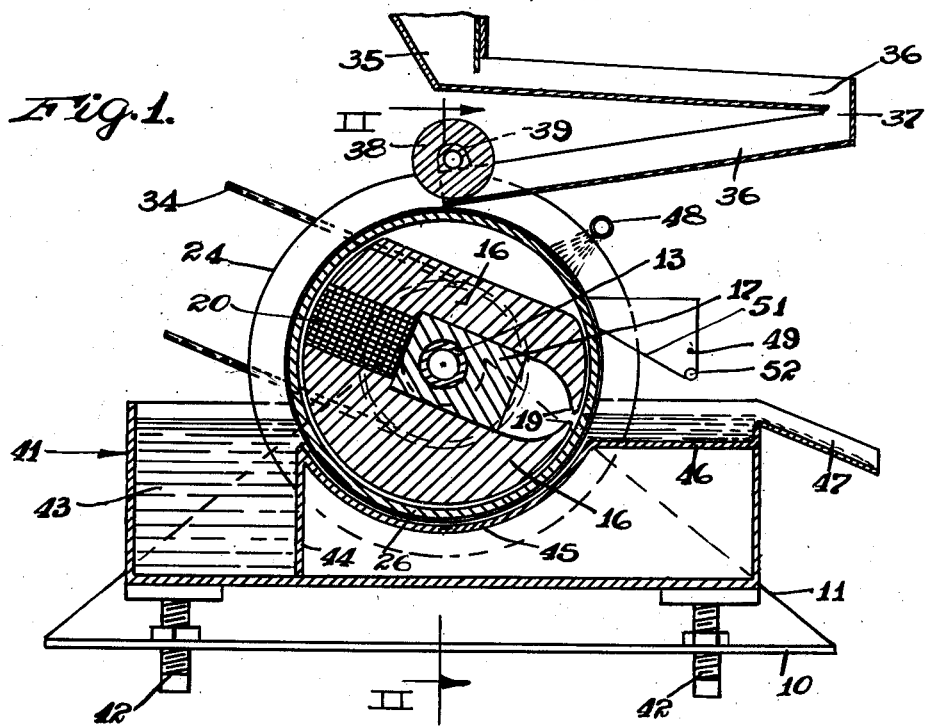
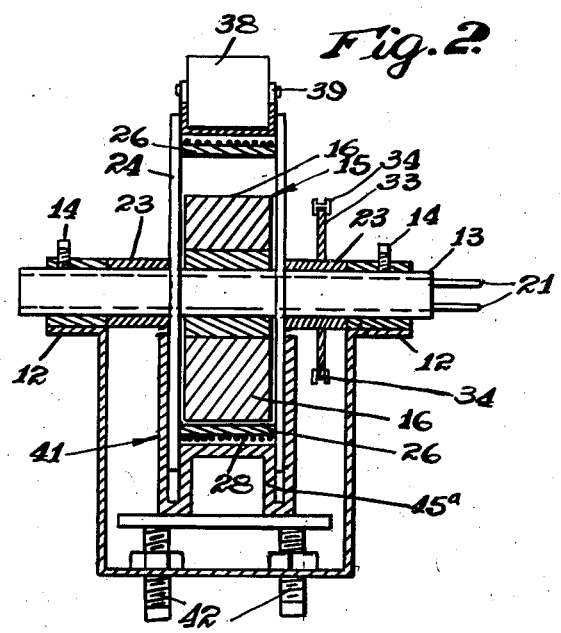
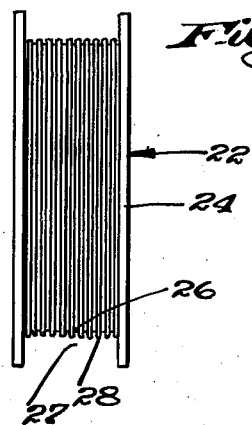
INVENTOR.
G. J. BAIR. AND
J. S. CORT. JR.
BY Bradley + Bee
ATTORNEYS.

Patented Feb. 4, 1941

2,230,344

UNITED STATES PATENT OFFICE 2,230,344

METHOD OF REMOVING MAGNETIC IMPURITIES FROM FINELY DIVIDED MATERIALS

George J. Bair, Pittsburgh, and John S. Cort, Jr., Kittanning, Pa., assignors to Norbert S. Garbisch Application October 22, 1938, Serial No. 236,546

3 Claims. (Cl. 209—214)

The present invention relates to methods of of and removal of very finely divided particles of magnetic material such as metallic iron from slurries or suspensions of finely divided non-magnetic material, and it has particular relation to the removal of minute particles of metallic iron from the finely divided wastes resulting from the grinding of plate glass with sand.

One object of the invention is to provide a method of removal of finely divided iron from waste sand, which method is capable of reducing the iron content of the slurry or suspension to an exceptionally low percentage. This and other objects of the invention will become apparent from consideration of the following specification and appended claims.

In the grinding of plate glass in order to remove surface irregularities, it is customary to cement the plates to the top of a revolving table or to the top of a moving car and then to contact the surface of the glass with revolving runner blocks of cast iron, while simultaneously feeding a slurry or suspension of sand or similar abrasive upon the surface undergoing treatment. The particles of sand under the pressure exerted by the revolving runner blocks abrade away the surface irregularities of the glass. However, simultaneously the particles of sand are gradually worn away and broken up so that they become less and less effective as an abrasive agent. From time to time the slurry is subjected to classification operation in which the particles of silica comprising the sand are separated into coarser and finer grades. The coarser material may be returned for reuse in the cycle. The finer material is either advanced for subsequent cuts in the treating line or if too fine for further use, it is discarded.

Ultimately all of the sand is reduced to such fine state of subdivision that it cannot longer be used for grinding purposes. The resultant slurry consists essentially of particles of silica from the sand, glass abraded from the plates together with some waste plaster and with about 1 or 2 percent of iron abraded from the runner discs. All of this solid material of course is suspended in water. The average particle size of the material is probably in the neighborhood of about 20 microns, and it is found that nearly all of it will pass through a screen of about 300 or 400 mesh.

Numerous uses have now been suggested for this material, among which may be included use as a substitute for sand and cullet in a glass batch, use as a substitute for flint and felspar in the manufacture of pottery, and the use as a substitute for clay in foundry sands. For most of these purposes, it is necessary that a considerable percentage of the iron content be removed. It has been found feasible to remove such iron by treating the material with a dilute acid in order chemically to dissolve the iron and then to wash away the iron salts.

It has, also, been found that a considerable percentage of the iron present, notably if the material has been freshly received from the grinding tables or cars, is still in metallic form and is therefore relatively highly magnetic. It has been proposed to remove this metallic iron by subjecting the iron in suspension in water to the action of a magnetic separator of conventional type. By such means it has been possible to reduce the iron content by about 50 per cent. Such reduction is not satisfactory for many purposes. Satisfactory removal of the metallic iron by magnetic means has heretofore been impossible, or at least impractical. It might have reasonably been assumed that the failure to obtain a larger percentage of the iron occurred because the latter in its fine state of division had become so corroded or oxidized that it no longer possessed magnetic properties.

The present invention is based upon the discovery that at least to a considerable extent the failure to obtain more satisfactory removal of the iron content from waste sand was due not to the conversion of the iron into non-magnetic oxides, or other compounds, but to the fact that the particles were so finely divided that the specific surface of the particles was so great as to result in great retardation of movement of the particles through the suspending medium. Turbulence in the liquid and such like causes were sufficient to carry many of the particles of iron away even though powerful magnetic separators, of the type in which the material to be treated is caused to flow in a stream past the gap between the pole pieces of a powerful electromagnet, were employed. The latter are among the most efficient separators known.

The present invention involves the discovery that if preliminary to exposing the material to the action of the intense field adjacent to the pole pieces of the magnet, in the above type of separators, it is exposed for a considerable period while in quiescent flow to the relatively weak field about the magnet, much more efficient removal of the magnetic iron results.

For a better understanding of the invention reference may now be had to the accompanying drawing in which like numerals refer to like parts throughout.

In the drawing

Figure 1 is a cross-sectional view taken in a longitudinal plane of the apparatus.

Figure 2 is a cross-sectional view taken substantially upon the line II—II of Figure 1.

Figure 3 is a fragmentary elevational view of the winding of a magnetic drum employed in the practice of the invention.

The apparatus conveniently embodies a base 10 having upright brackets 11 at the sides thereof. The brackets at their upper extremities are provided with bearings 12 in which are disposed a horizontal shaft 13, which may be clamped from rotation in the bearings by means of set screws 14.

Shaft 13 supports a powerful electromagnet comprising armature 15, the pole pieces 16 of which are approximately parallel and are secured upon a block of non-magnetic material 17 fixed upon the shaft by any convenient means. It will be observed that the pole pieces curve and taper to horn-like tips 19, which are separated by a short gap. In this gap the intensity of the magnetic field is many times that of the field surrounding the remainder of the pole pieces. The armature is excited or energized by means of an electrical coil 20 disposed about the intermediate portion of the armature, said coil being connected by means of conductors 21 extending outwardly through shaft 13 and bearings 12 to a source of direct electrical current (not shown).

A rotatable drum 22 of thin steel or of a non-magnetic material such as bronze is also disposed upon shaft 13 intermediate of the bearings 12 and embodies bearings 23 rotating upon the shaft and end discs or trunnions 24 secured upon the bearings. The discs project radially beyond the circumference of the surface 26 of the drum to provide a peripheral groove or channel 27 within which is disposed a magnetic winding 28 comprising a single layer of peripherally extending iron wire, which in effect provides peripheral ridges about the drum. The magnetic field induced in these ridges is concentrated at the apices thereof and thus produce stronger adherence to the drum than would otherwise be obtained.

The drum is rotated by any suitable mechanism, for example, by means of a sprocket gear 33, which is keyed upon one of the bearings 23 and which is driven by a chain 34 that has a driving connection with a motor (not shown).

A slurry of waste sand is continuously fed from a hopper 35, to the surface of the drum preferably adjacent to the upper portion thereof by means of a chute 36 which may include one or more bends, or angles 37, in order to increase the length of path of travel of the slurry through the magnetic field surrounding the drum. By thus subjecting the material preliminarily to a magnetic field it is found that the particles become more or less magnetized. Such magnetization tends to make the particles of iron more readily removable. It is also possible to introduce one or more magnetic pulleys or drums 38 into the chute, for example, by supporting them in bearings 39 upon the edges of the chute. These drums tend preliminarily to remove a certain amount of the iron. However, their efficiency is relatively low as compared with the main drum, and if desired, their use may be dispensed with.

Waste sand discharged from the chute 36 is discharged upon the surface of the drum and flows downwardly along the surface of the latter in the direction in which it rotates. In order to maintain the waste material in quiescent contact with the drum over a relatively great arc of the surface thereof the waste material is received into a trough or tank 41 into which the lower portion of the drum extends. This trough is adjustably supported upon threaded bolts or screws 42 extending upwardly through the base 10 in such manner that the degree of emersion of the surface of the drum can be varied at will simply by rotating the screws. Trough 41 includes a reservoir 43 into which the material from the chute may run in order to permit it to become relatively quiescent. The forward wall 44 of the reservoir within the tank 41 terminates adjacent to the surface 26 of the drum and at a substantial distance below the surface of the slurry. The upper edge of the wall is extended into an elongated lip or apron 45 which is arcuate in cross-sectional outline, is approximately of the same width as the space between discs 24, and substantially corresponds in curvature to the curvature of the drum. The lip or apron may be provided with skirts 45a resting on the bottom of tank 41 and its forward end is extended to form a horizontal discharge chute or trough 46 through which the non-magnetic material including the water and the finely divided silica and cullet are discharged. The forward end of trough 46 terminates in a dam or weir 47 which maintains a quiescent pool or reservoir about the terminus of the apron 45—and the gap between the pole pieces of the magnet is disposed adjacent to this zone.

The arrangement of the reservoirs and the apron is such that slurry must first travel downwardly and then upwardly about the drum. The arc of contact is about one-third or one-fourth of the total circumference of the drum.

The iron adhering to the surface of the drum is carried upwardly by the magnetism of winding 28 and for purposes of removing it, the drum is sprayed with water from suitable nozzles 48; the waste water from the latter is received in a trough-like receptacle 49, the rear wall 51 of which terminates adjacent to the winding 28. The washings containing the particles of iron flows out of the trough through outlet 52.

In the operation of the apparatus shown and described it will be assumed that the reservoir 43, arcuate apron 45 and discharge trough 46 are filled with slurry or suspension of waste sand in such manner that a relatively large arc of the surface of the drum is completely immersed. The level of liquid on both sides of the drum is nearly equal and a stream flows from the quiescent zone in the reservoir 43 and passes out through a quiescent zone adjacent to the surface of the drum in the discharge chute 46. The pole pieces 16 are then adjusted to bring the gap between the horn-like tips into proximity to the surface of the liquid in the chute 46. The rate of flow of slurry through the chute 36 is adjusted to the proper value and the magnetic drum is rotated by means of chain drive 34 at a rate of about 13 revolutions per minute. In order to reduce turbulence about the drum, the height of trough 41 is then adjusted by means of screws 42 in such manner as to obtain a passageway between apron 45 and the surface 26 of the drum of such dimensions that the rate of travel of the fluid suspension approximately corresponds to the rate of travel of the surface. Then when current is supplied through conductors 21 to excite coil 19, it will be found that the particles of iron suspended in the water will be attracted to the surface of the drum and by reason of the relatively strong induced attraction of the winding 28, the particles will be lifted from the liquid and will be carried upwardly past the gap between the pole pieces and finally washed from the drum by means of the spray from the nozzle 48.

Although the intensity of the field about the pole pieces through the major length of the apron 45 is probably but a tiny fraction of that in the zone adjacent to the gap between the pole pieces, it is found that the prolonged exposure to the pull of the magnetic flux affords time for the more minute particles of iron to migrate through the liquid medium and thus to contact with the surface of the drum. By reason of the simultaneous movement of both the liquid and the magnetic surface in the same direction and at approximately the same rate there is but slight turbulence in the liquid, and therefore the minute particles are not whirled about in eddys, but progress continuously toward the surface of the drum until eventually contact is established. By actual experience it has been found that about 50 per cent of the residual iron normally remaining in the liquid after exposure to the intense magnetic field adjacent to the gap between the pole pieces of a conventional separator, and which might be assumed to be non-magnetic iron, is removed. At the same time the percentage of silica and other material normally removed along with the magnetic iron is considerably reduced. The fraction of iron thus obtained is extremely finely divided and would be excellent for use as a substitute for conventional iron filings in chemical reductions. Many other uses for which finely divided metallic iron are suitable are also contemplated.

The non-magnetic material including the silica, glass and probably certain non-magnetic compounds, of iron in small amounts are discharged from the chute 47 and may be filtered, dried and converted into glass batch or applied to any other desired purpose for which the material is adapted.

Although only the preferred forms of the invention have been shown and described, it will be apparent to those skilled in the art that there are merely exemplary and numerous modifications may be made therein without departing from the spirit of the invention or the scope of the following claims.

What we claim is:

1. A method of removing the finely-divided runner bar iron from waste sand obtained from the surfacing of glass plates with a slurry of essentially iron free sand as an abrasive, which method comprises flowing a slurry of said sand while fresh from the grinding operations upon a rotating horizontal magnetic drum adjacent to the top thereof and in such manner that it flows down over the side of the drum in the direction of rotation, collecting the slurry in a pool which contacts the side of the drum, flowing the slurry from the pool under the drum and up along the opposite side in a relatively non-turbulent sheet moving in the direction of rotation of the drum and at a rate approximating the peripheral speed of the drum, whereby the minute particles of iron are gradually brought into contact with the drum, subsequently collecting the slurry in a quiescent pool on the opposite side of the drum, the surface levels of the two pools being substantially equal from which quiescent pool the slurry is gradually drawn off while the iron is lifted therefrom by the drum.

2. A method of removing finely-divided iron resulting from abrasion of the runner blocks from waste sand from the surfacing of glass plates with a slurry of sand as an abrasive, which method comprises flowing a slurry of said sand while fresh from the grinding operations upon a rotating horizontal magnetic drum adjacent to the top thereof and in such manner that it flows down over the side of the drum in the direction of rotation, collecting the slurry in a pool which contacts the side of the drum, flowing the slurry from the pool under the drum and up along the opposite side in a relatively non-turbulent sheet moving in the direction of rotation of the drum and at a rate approximating the peripheral speed of the drum, whereby the minute particles of iron are gradually brought into contact with the drum, subsequently collecting the slurry in a quiescent pool on the opposite side of the drum from which pool the slurry is gradually drawn off while the iron is lifted therefrom by the drum, the slurry in the latter pool being subjected to a magnetic field of substantially greater intensity than the remainder of the slurry about the drum the surfaces of said pools being substantially at the same level.

3. A method of obtaining a mixture of a finely-divided silica and glass substantially free of metallic iron from intimate and very finely-divided mixture of silica, glass and particles of iron, which mixture results from the surfacing of glass plates with a slurry of essentially pure silica under iron runner bars, which method comprises rotating a magnetic drum in horizontal position with its surface partially immersed in a body of fresh slurry of waste sand, the slurry being contacted with one side of the drum and being withdrawn on the opposite side, the direction of flow being in the direction of travel, and the rate of travel being approximately equal to that of the surface of the drum immersed in the slurry, the slurry being maintained in a quiescent pool about the zone of emergence of the surface of the drum the liquid levels upon opposite sides of the drum being substantially equal.

GEORGE J. BAIR.
JOHN S. CORT, Jr.